US010332376B2

(12) United States Patent
Lin

(10) Patent No.: US 10,332,376 B2
(45) Date of Patent: Jun. 25, 2019

(54) WORKPLACE MANAGEMENT SYSTEM AND WEARABLE DEVICE THEREFOR

(71) Applicant: Cheng Chieh Investment Co., Ltd., Taoyuan (TW)

(72) Inventor: Hsia-Sen Lin, Taoyuan (TW)

(73) Assignee: CHENG CHIEH INVESTMENT CO., LTD., Taoyuan (TW)

( * ) Notice: Subject to any disclaimer, the term of this patent is extended or adjusted under 35 U.S.C. 154(b) by 0 days.

(21) Appl. No.: 15/859,962

(22) Filed: Jan. 2, 2018

(65) Prior Publication Data

US 2019/0164402 A1 May 30, 2019

(30) Foreign Application Priority Data

Nov. 28, 2017 (TW) .............................. 106141278 A

(51) Int. Cl.
*G06Q 10/10* (2012.01)
*G08B 21/02* (2006.01)
*G07C 9/00* (2006.01)

(52) U.S. Cl.
CPC ..... *G08B 21/0288* (2013.01); *G06Q 10/1091* (2013.01); *G07C 9/00* (2013.01); *G08B 21/0211* (2013.01); *G08B 21/0258* (2013.01); *G08B 21/023* (2013.01)

(58) Field of Classification Search
CPC .................. G08B 21/0288; G06Q 10/1091
USPC ...................................................... 340/870.09
See application file for complete search history.

(56) References Cited

U.S. PATENT DOCUMENTS

| 2008/0313939 | A1* | 12/2008 | Ardill | ........................ G09F 3/02 40/329 |
| 2015/0222576 | A1* | 8/2015 | Anderson | ........... G06F 3/04817 715/752 |
| 2015/0310263 | A1* | 10/2015 | Zhang | ................. G06K 9/00315 382/103 |
| 2016/0044024 | A1* | 2/2016 | Hwang | ................ H04L 63/0838 726/7 |
| 2016/0048296 | A1* | 2/2016 | Gan | ......................... G06F 3/147 715/745 |
| 2016/0132046 | A1* | 5/2016 | Beoughter | ......... G06F 17/30554 700/17 |
| 2017/0061200 | A1* | 3/2017 | Wexler | ................ G06K 9/00255 |
| 2018/0025656 | A1* | 1/2018 | Cronin | .............. G06Q 10/06311 434/236 |

(Continued)

*Primary Examiner* — Santiago Garcia
(74) *Attorney, Agent, or Firm* — Bacon & Thomas, PLLC

(57) ABSTRACT

A workplace management system includes a wearable device and a cloud server. The wearable device includes a processing chip and a communication chip connected to the processing chip. The cloud server is in communication with the wearable device. The cloud server includes an operating module, a transceiver module, a storage module storing working mode data, and a processing module. The processing module is configured to apply a current working mode data from the working mode data stored in the storage module according to an instruction given by a user using the operation module, control the transceiver module to transmit the present working mode data in an electromagnetic form, control the transceiver module to receive a response message generated by the wearable device in response to the current working mode data, and control the transceiver module to transmit a call message according to the response message.

9 Claims, 12 Drawing Sheets

(56) References Cited

U.S. PATENT DOCUMENTS

2018/0091176 A1* 3/2018 Chin .................. G02B 27/0101
2018/0131907 A1* 5/2018 Schmirler .......... H04N 5/23238
2018/0197624 A1* 7/2018 Robaina ............... A61B 3/0041

* cited by examiner

| Working Mode | Time Reference Value | Location Reference Value | Environmental reference value | Physiological reference value |
|---|---|---|---|---|
| Ground temporary work | 08:00-12:00<br>14:00-18:00 | 0<r<1m<br>0<θ<360° | Environmental temperature: 25°C<br>Environmental illuminance: 300lux<br>$O_2$ concentration: 20.9%<br>$CO_2$ concentration: 400ppm<br>Carbon monoxide concentration: 0 | Body temperature: 36°C<br>heartbeat frequency: 70times/min<br>Breath frequency: 20times/min<br>Expired $CO_2$ concentration: 40000ppm<br>v<1m/s |
| Ground landscape work | 08:00-12:00<br>14:00-18:00 | 1m<r<5m<br>0<θ<90° | Environmental temperature: 25°C<br>Environmental illuminance: 300lux<br>$O_2$ concentration: 20.9%<br>$CO_2$ concentration: 400ppm<br>Carbon monoxide concentration: 0 | Body temperature: 36°C<br>heartbeat frequency: 80times/min<br>Breath frequency: 25times/min<br>Expired $CO_2$ concentration: 40000ppm<br>1m/s<v<2m/s |
| Underground renovation work | 06:00-10:00<br>16:00-20:00 | 0<r<5m<br>180<θ<360° | Environmental temperature: 15°C<br>Environmental illuminance: 50lux<br>$O_2$ concentration: 20%<br>$CO_2$ concentration: 600ppm<br>Carbon monoxide concentration: 10ppm | Body temperature: 36°C<br>heartbeat frequency: 80times/min<br>Breath frequency: 25times/min<br>Expired $CO_2$ concentration: 40000ppm<br>0<v<1m/s |

FIG. 4

WORKPLACE MANAGEMENT SYSTEM AND WEARABLE DEVICE THEREFOR

BACKGROUND OF THE INVENTION

1. Field of the Invention

The present invention relates to a workplace management system, and a wearable device used for the workplace management system.

2. Description of Related Art

Wearable device technology is a very popular research topic. It is known that wearable devices can detect body information, such as breath, heartbeat, temperature, walking distance or number of steps. However, those detected results are fragmented information. Even if people get the fragmented information, they still have to determine their own health based on their memory or reasoning. It is not an effective way for personal health management, not to mention team health management.

Besides, there are different properties to be detected in different environments. In order to ensure work safety, a worker may have to carry various detection instruments and operate them one by one. This becomes a burden for the worker. Similarly, there are different risk factors to be monitored in different environments. Without a unified management, a team health management may not be considered strict enough because it depends on the leader's experiences and actions for reminding the worker's behaviors and monitoring the worker's situation from time to time.

The cloud technology is another popular research topic. Nowadays, various data can be uploaded from the terminal device to the cloud server and stored therein. However, the data are also fragmented information, and data uploading or downloading is typically determined by the terminal device, while the cloud server cannot reversely control the terminal device. Therefore, it is not helpful to build a two-way communication for effective management.

In light of above, the prior art is required to be improved.

SUMMARY OF THE INVENTION

According to the first aspect of the present invention, there is provided a workplace management system including a wearable device and a cloud host. The wearable device includes a processing chip and a communication chip connected to the processing chip. The cloud host is in communication with the wearable device. The cloud host includes an operation module, a transceiver module, storage module storing a plurality of working mode data and a processing module connected to the operation module, the transceiver module and the storage module, wherein the processing module is configured to: apply current working mode data from the working mode data stored in the storage module according to an instruction given by a user using the operation module; control the transceiver module to transmit the current working mode data in an electromagnetic form; control the transceiver module to receive a response message generated by the wearable device in response to the current working mode data; and control the transceiver module to transmit a call message according to the response message.

In the present invention, plural working mode data stored in the cloud host of the workplace management system represent working condition parameters configured according to experience for different working modes. It is possible to categorize working modes into, for example, ground, underground, water surface, underwater, mountaintop, cave and high altitude engineering in terms of locations, or into, for example, temporary work, earthwork, foundation work, construction work, renovation work, appurtenant work, residual work and landscape work in terms of projects.

In this way, before starting the work, the user, such as the worker himself or his supervisor, can choose one working mode to be the current working mode from the plural working mode data. The cloud host will send (or upload) some or the whole of the current working mode data to the wearable device. Accordingly, the wearable device will detect various physiological or environmental parameters, and transmit a response message. The cloud host will compare the response message with the working mode data to determine the worker's attendance conditions, working conditions, body conditions or the local safety.

In other words, the present invention aims to build a communication between the cloud host and the wearable device and, particularly, to activate the functions of the cloud host and the wearable device by typology, thereby precisely taking control of the workplace environment and the worker's conditions.

According to the second aspect of the present invention, there is provided a wearable device used for a workplace management system. The wearable device includes a processing chip and a communication chip connected to the processing chip, wherein the processing chip is configured to: control the communication chip to receive current working mode data from a cloud host; generate a response message in response to the current working mode data; control the communication chip to transmit the response message in an electromagnetic form; and control the communication chip to receive a call message from the cloud host.

The wearable device in the second aspect of the present invention can work in alliance with the workplace management system in the first aspect of the present invention. Similarly, the first aspect and the second aspect of the present invention aim to build a communication between the cloud host and the wearable device and, particularly, to activate the functions of the cloud host and the wearable device by typology, thereby precisely taking control of the workplace environment and the worker's conditions. However, the wearable device in the second aspect of the present invention can be made, sold or used as an individual product.

In some embodiments of the present invention, the wearable device further includes components such as a heartbeat detector, a breath detector, a brain wave detector, a gas detector, a light detector, an environmental thermometer, a body thermometer, a gyroscope, an accelerometer or a microphone, and one or more of the aforementioned components can be activated according to the current working mode. For example, in the case of general ground engineering, the gas detector, the environmental thermometer and the body thermometer may not be in use and may be turned off to save power and memory of the wearable device.

BRIEF DESCRIPTION OF THE DRAWINGS

FIG. 4 shows an example of the working mode data according to the first embodiment of the present invention;

DETAILED DESCRIPTION OF THE PREFERRED EMBODIMENT

The present invention will be explained in relation to its embodiments. It is to be understood that the embodiments, given below, are proposed for exemplification rather than for limitation, and that the present invention can be implemented, through many other possible modifications, transformations, combinations, separations, and modulations in line with the features of the present invention.

First Embodiment

Figure 1:
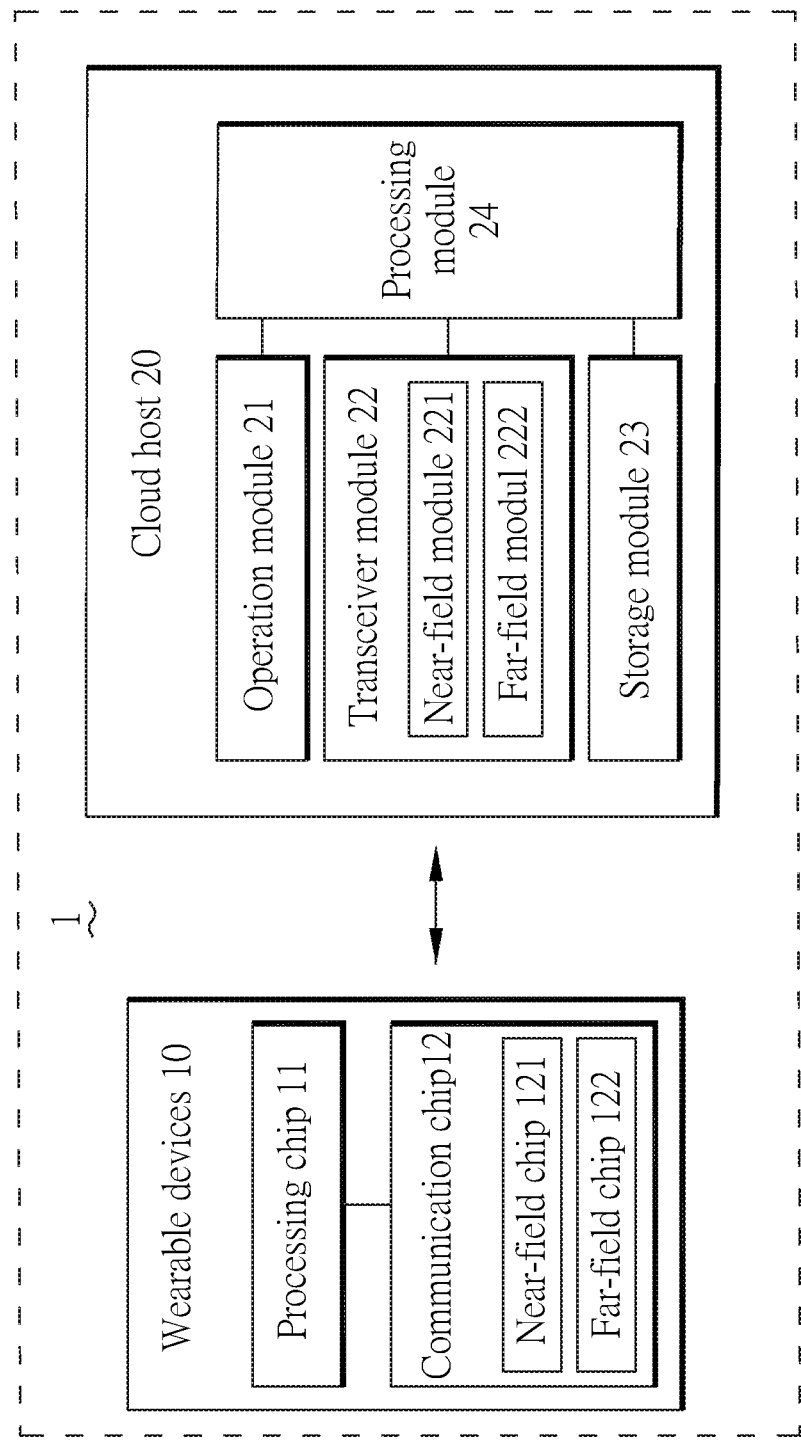
FIG. 1 shows a block diagram of the workplace management system according to the first embodiment of the present invention.
Figure 2:
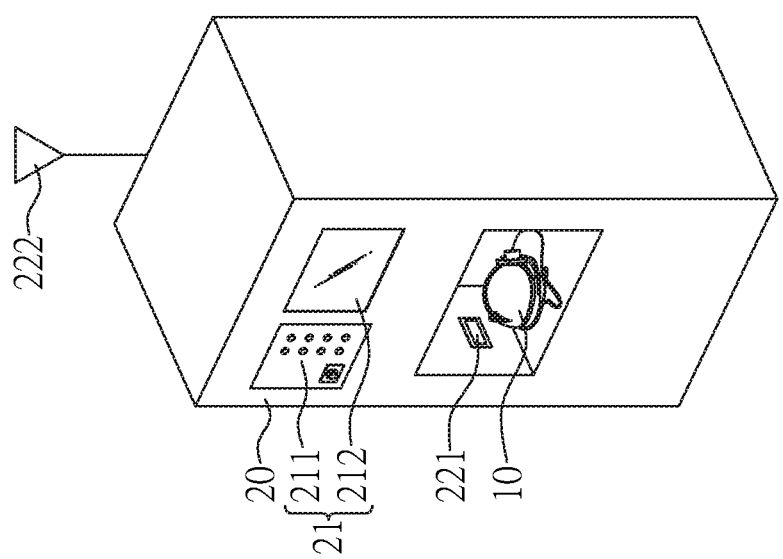
FIG. 2 shows a perspective diagram of the workplace management system according to the first embodiment of the present invention.

FIG. 1 shows a block diagram of the workplace management system 1 according to the first embodiment of the present invention. FIG. 2 shows a perspective diagram of the workplace management system 1 according to the first embodiment of the present invention. Referring both to FIGS. 1 and 2, the workplace management system 1 includes a wearable device 10 and a cloud host 20. The wearable device 10 includes a processing chip 11 and a communication chip 12 connected to the processing chip 11. Each of the processing chip 11 and the communication chip 12 can be an integrated circuit (IC) chip.

The cloud host 20 is in communication with the wearable device 10. The term "communication" is referred to a connection by wired network or wireless network for data transmission.

The cloud host 20 includes an operation module 21, a transceiver module 22, a storage module 23 and a processing module 24. The processing module 24 is connected to the operation module 21, the transceiver module 22 and the storage module 23 for data processing and data transmission.

The operation module 21 includes an input device 211, such as a keyboard, a mouse, a touch-control device or a voice-control device, and an output device 222, such as a display or a speaker.

The transceiver module 22 can be a wired communication device or a wireless communication device.

Optionally, the transceiver module 22 may include a near-field module 221 and a far-field module 222, and the communication chip 12 may correspondingly include a near-field chip 121 and a far-field chip 122. The near-field module 221 and the near-field chip 121 can be contactless cards, contactless readers or point-to-point communication devices. The far-field module 222 and the far-field chip 122 can provide functions such as mobile communication, Wi-Fi or Bluetooth. In this case, optionally, the processing module 24 can determine either to communicate with the near-field chip 121 by the near-field module 221 or to communicate with the far-field chip 122 by the far-field module 222 according to a location signal transmitted from the wearable device 10. Communication carriers can be radio waves, microwaves, terahertz radiation or infrared radiation.

As shown in FIG. 2, the cloud host 20 may include a support table which the wearable device 10 can be put on. The support table has a near-field module 221 for a near-field communication.

Figure 3:
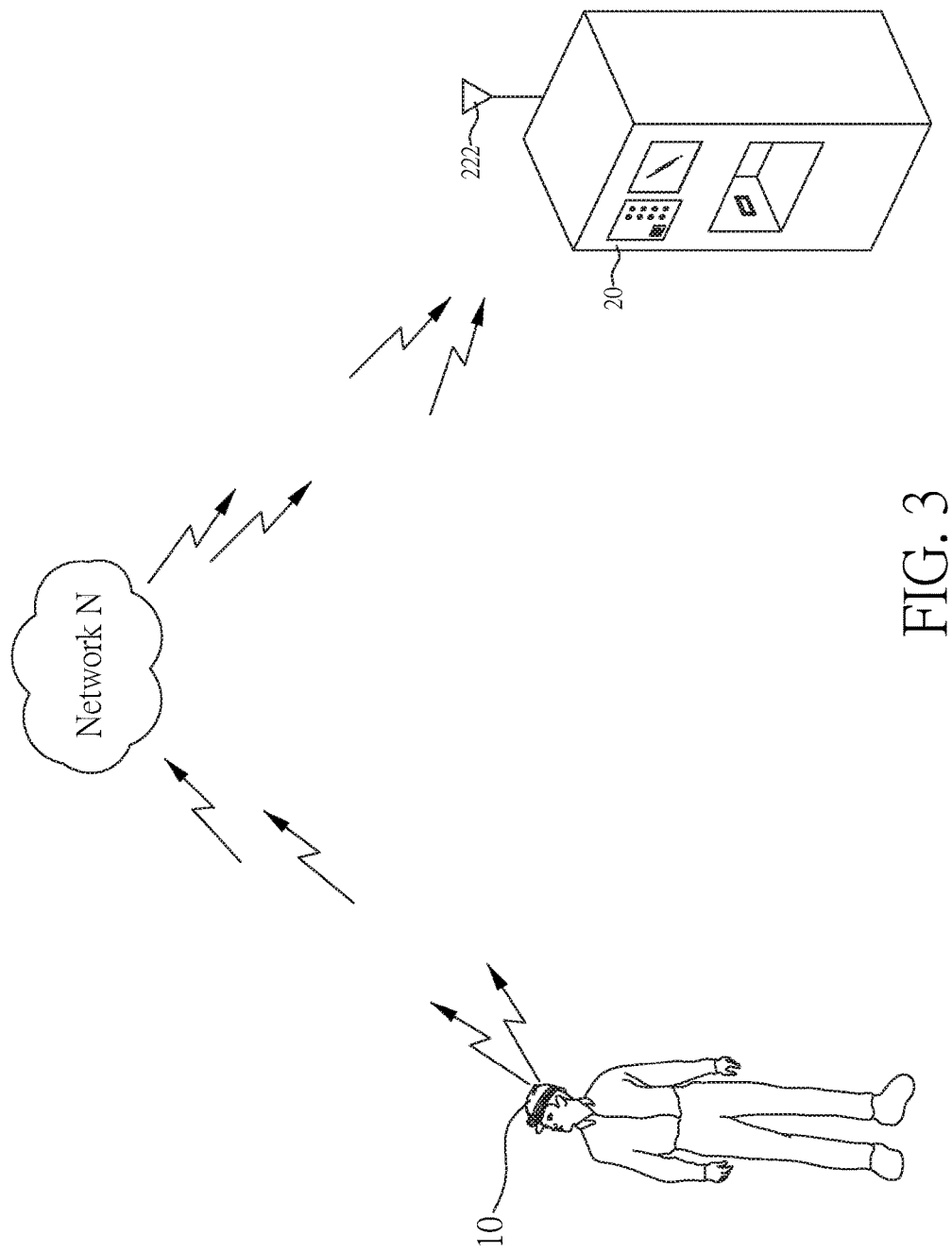
FIG. 3 shows the far-field communication of the workplace management system according to first embodiment of the present invention.

FIG. 3 shows the far-field communication (through a network N) of the workplace management system according to the first embodiment of the present invention.

The storage module 23 includes a hard disk or a memory to store a plurality of working mode data. Working modes can be categorized into, for example, ground, underground, water surface, underwater, mountaintop, cave and high altitude engineering in terms of locations. Alternatively, working modes can be categorized into, for example, temporary work, earthwork, foundation work, construction work, renovation work, appurtenant work, residual work and landscape work, in terms of projects. The working mode data includes working condition parameters configured according to experience for different working modes.

FIG. 4 shows an example of the working mode data according to the first embodiment of the present invention, including working modes such as ground temporary work, ground landscape work and underground renovation work. Each of the working mode data records a time reference value, a location reference value, an environmental reference value or a physiological reference value, varying with the locations and the projects. In FIG. 4, 'Y' represents the distance from the wearable device 10 to the cloud host 20, centered at the cloud host 20; "θ" represents the angle rotating from 0° (for example, the east) to the location of the wearable device 10, centered at the cloud host 20; "v" represents the average speed of the wearable device 10.

The classification (the typology) of working modes provides many benefits, for example:

Firstly, the wearable device 10 or the cloud host 20 can turn on or off some functions to economize the power and the memory of the wearable device 10 according to the current working mode chosen from the working modes.

Secondly, workers assigned to different works, or working in different environments can choose their respective current working modes before starting the work, and thus it is possible to divide the workers into groups and manage each group according to the corresponding current working mode.

Thirdly, workers assigned to different works, or working in different environments can still use the wearable devices 10 of the same type, as long as set with different management conditions.

Fourthly, workers do not have to carry various detection instruments separately, but can use the integrated wearable device 10 to detect working condition parameters.

Fifthly, various working condition parameters can be detected by the integrated wearable device 10, being encoded and transmitted jointly as a response message carried in electromagnetic wave envelopes, and being received and decoded jointly by the cloud host 20. This realizes a synchronous information processing. In this way, it is possible to determine worker's working conditions even precisely according to the various working condition parameters.

Sixthly, working condition parameters can be investigated in advance, being set in different working modes stored in the cloud host 20, or further being downloaded to the wearable device 10, so that the cloud host 20 or the wearable device 10 can automatically discover and avoid the danger to the worker.

Figure 5:
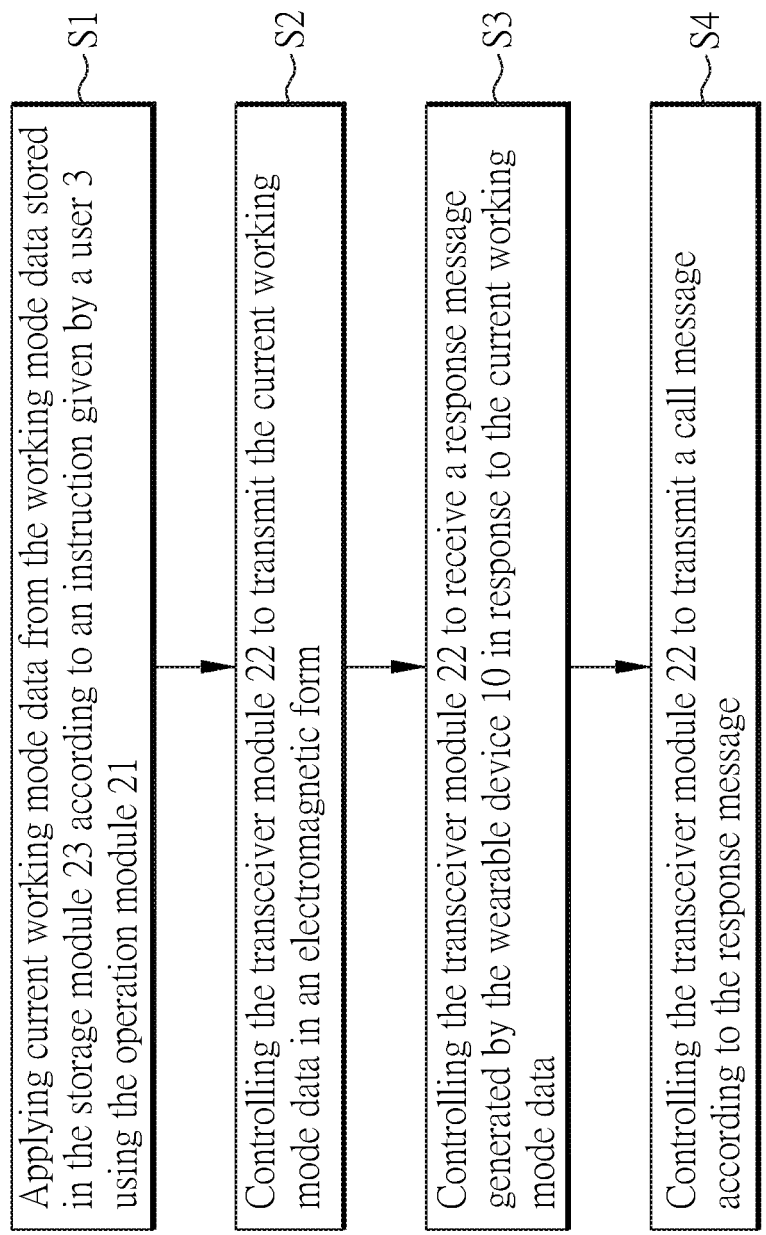
FIG. 5 shows the process of the processing module according to the first embodiment of the present invention.

FIG. 5 shows the process of the processing module 24 according to the first embodiment of the present invention. The processing module 24 is configured to execute the following steps S1 to S4:

Step S1 is provided to apply current working mode data from the working mode data stored in the storage module 23 according to an instruction given by a user 3 using the operation module 21;

Step S2 is provided to control the transceiver module 22 to transmit the current working mode data in an electromagnetic form;

Step S3 is provided to control the transceiver module 22 to receive a response message generated by the wearable device 10 in response to the current working mode data; and Step S4 is provided to control the transceiver module 22 to transmit a call message according to the response message.

In particular, in step S1, before starting the work, the user 3, such as the worker himself or his supervisor, can choose one working mode to be the current working mode from the plural working mode data. Then, in step S2, the cloud host 20 will send (or upload) some or the whole of the current working mode data to the wearable device 10. Accordingly, the wearable device 10 detects various physiological or environmental parameters, and transmits a response message. Then, in step S3, the cloud host 20 receives the response message. Finally, in step S4, the cloud host 20 compares the response message with the working mode data to determine the worker's attendance conditions, working conditions, body conditions or the local safety, and further determines whether to transmit the call message to contact with the worker or an ambulance staff.

Second Embodiment (Safety Management)

The workplace management system 1 of the present invention can realize safety management.

In particular, the response message transmitted from the wearable device 10 may include a plurality of detected signals, such as a heartbeat signal, a breath signal, a brain wave signal, a gas signal, a light signal, an environmental temperature signal, a body temperature signal, a body action signal or an acoustic signal. The processing module 24 compares the detected signals with the time reference value, the location reference value, the environmental reference value or the physiological reference value to determine whether to control the transceiver module 22 to transmit the call message.

For example, the processing module 24 may determine whether the wearable device 10 is attached to the worker's body, or whether the worker's body condition is normal according to the detected signals, typically with the heartbeat signal, the breath signal or the brain wave signal. If the processing module 24 determines that the wearable device 10 is detached from the worker's body, or the worker's body condition is abnormal, it controls the transceiver module 22 to transmit the call message, calling other person to patrol and check around the location of the wearable device 10.

For another example, the processing module 24 may determine whether the worker's body is in an idle state according to the detected signals, typically with the body action signal. If it determines that the worker's body is in an idle state, the control transceiver module 22 transmits a caution message to the wearable device 10 to remind the worker to return to work.

For another example, the processing module 24 may determine whether the worker is in danger according to the detected signals, typically with the gas signal, the light signal, the environmental temperature signal, the body temperature signal or the body action signal. If it determines that the worker is in danger, the control transceiver module 22 transmits a distress message. The distress message can be sent to a rescue staff, or it can activate a speaker or a siren equipped on the wearable device 10.

In order to even precisely evaluate workplace safety, the processing module 24 recalculates the current working mode data with the detected signals to update the time reference value, the location reference value, the environmental reference value or the physiological reference value of the working mode data, periodically or in real time.

Figure 6:
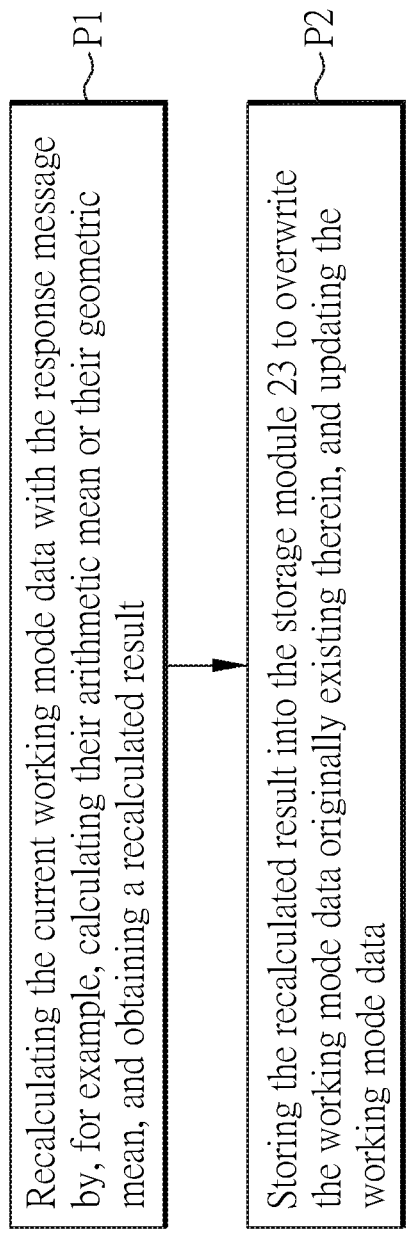
FIG. 6 shows the data update process of the cloud host according to the second embodiment of the present invention.

FIG. 6 shows the data update process of the cloud host 20 according to the second embodiment of the present invention. The processing module 24 of the cloud host 20 is configured to execute the following steps P1 and P2 after the steps S1 and S2:

Step P1 is provided to recalculate the current working mode data with the response message by, for example, calculating their arithmetic mean or their geometric mean, and obtain a recalculated result; and Step P2 is provided to store the recalculated result into the storage module 23 for overwriting the working mode data originally existing therein, and update the working mode data.

Before starting the work, the reference values of the working mode data stored in the storage module 23 may be only empirical values or estimated values because the workplace conditions remain unknown or uncertain. However, following the worker entering the workplace, the wearable device 10 can collect more data by the various detectors, and send them back to the cloud host 20 to update the reference values thereby approaching real working condition parameters.

Third Embodiment (Attendance Management)

The workplace management system 1 of the present invention may realize attendance management.

In particular, the processing module 24 compares the time signal and the location signal transmitted from the wearable device 10 with the time reference value and the location reference value to determine an attendance record.

Figure 7:
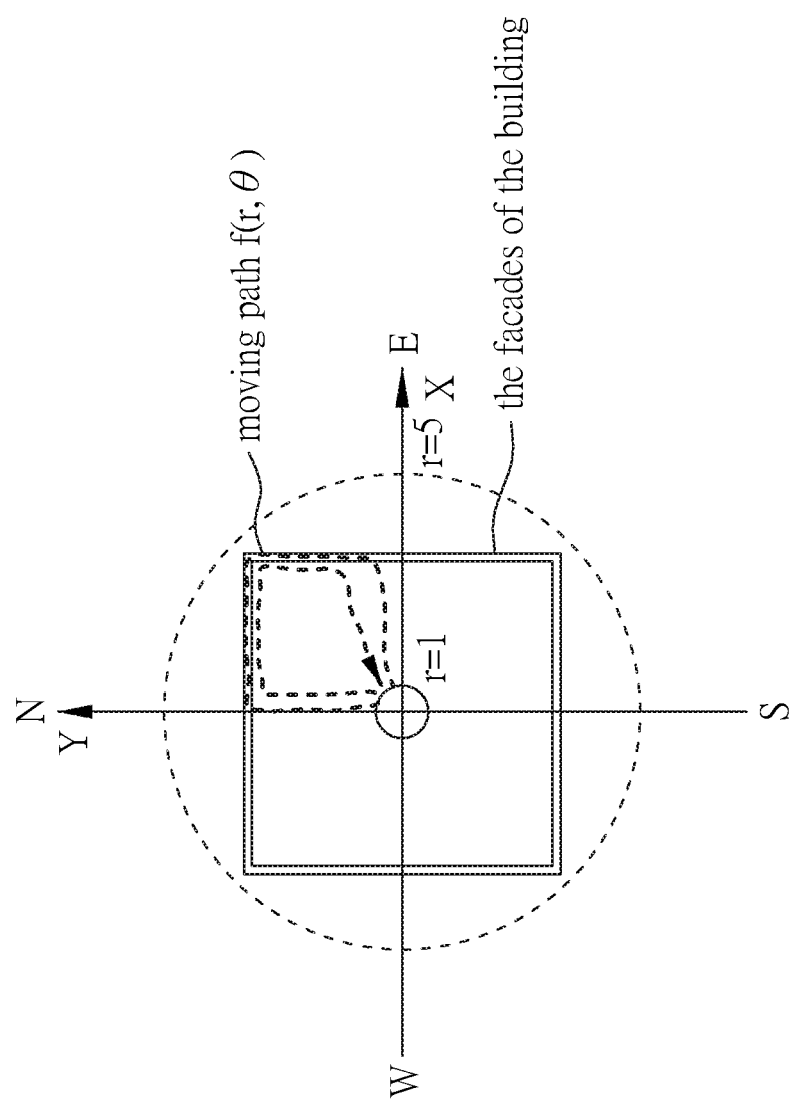
FIG. 7 shows the worker's range of motion according to the third embodiment of the present invention.
Figure 8:
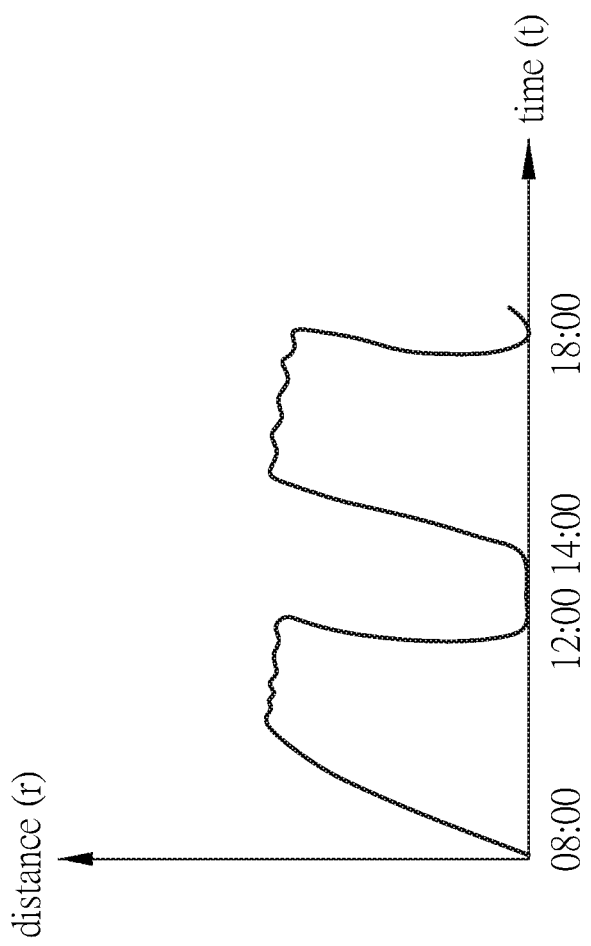
FIG. 8 shows the worker's moving distance with respect to time according to the third embodiment of the present invention.

FIG. 7 shows the worker's range of motion according to the third embodiment of the present invention. FIG. 8 shows the worker's moving distance with respect to time according to the third embodiment of the present invention, wherein $f(r,\theta)$ represents the worker's moving path. In this case, the worker is assigned to beautify the northeast facade of the building, doing a landscape work as shown in FIG. 4.

According to the time reference value in FIG. 4, the worker's working time shall be from AM 8:00 to AM 12:00 and from PM 14:00 to PM 18:00 and, according to the location reference value in FIG. 4, the worker's working region shall be within the range of 1 m<r<5 m. In one day, after receiving a time signal and a location signal from the wearable device 10, it is confirmed that the worker entered the working region at AM 8:00 and left the working region at AM 12:00 to take a rest in the lounge defined in the range of r<1 m, and the worker went back to the working region at PM 14:00 and left the working region at PM 18:00. In this way, the worker's attendance time can be checked and, in this case, the worker's attendance record is shown to be normal.

In addition, step S1 may further include a sub-step S11, which is provided to give the instruction given by the user 3 using the operation module 21 by entering a staff name or a staff number. The workplace management system 1 may realize a function of attendance recording as a punch clock. Moreover, the working mode can be applied directly according to the staff name or the staff number in step S1, and the worker can understand his current work at the same time.

In the prior art, a worker wears a hard hat passively only if he is under supervision. This kind of passive management is ineffective. Compared with the prior art, the attendance management according to the third embodiment of the present invention is helpful to the safety management because a worker has to wear the wearable device 10 (for example, a hard hat) actively during his work to record his attendance time, and the existence of the wearable device 10 (for example, a hard hat) ensures his safety during his work. This kind of active management is advantageous by combining safety and attendance.

Fourth Embodiment

Figure 9:
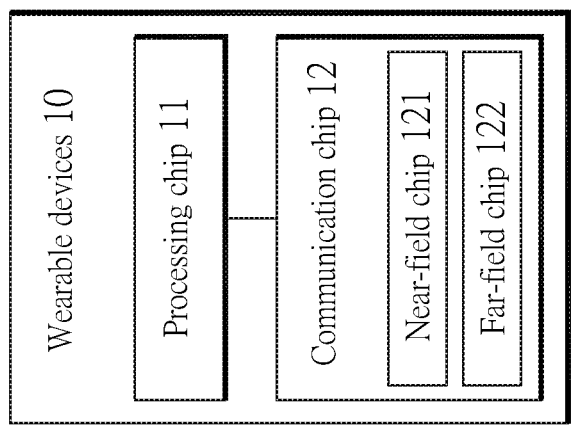
FIG. 9 shows the wearable device according to the fourth embodiment of the present invention.

FIG. 9 shows the wearable device 10 according to the fourth embodiment of the present invention. The wearable device 10 is used, for example, for the workplace management system 1 in the aforementioned embodiments. The wearable device 10 includes a processing chip 11 and a communication chip 12 (which may further include a near-field chip 121 and a far-field chip 122) connected to the processing chip 11.

Figure 10:
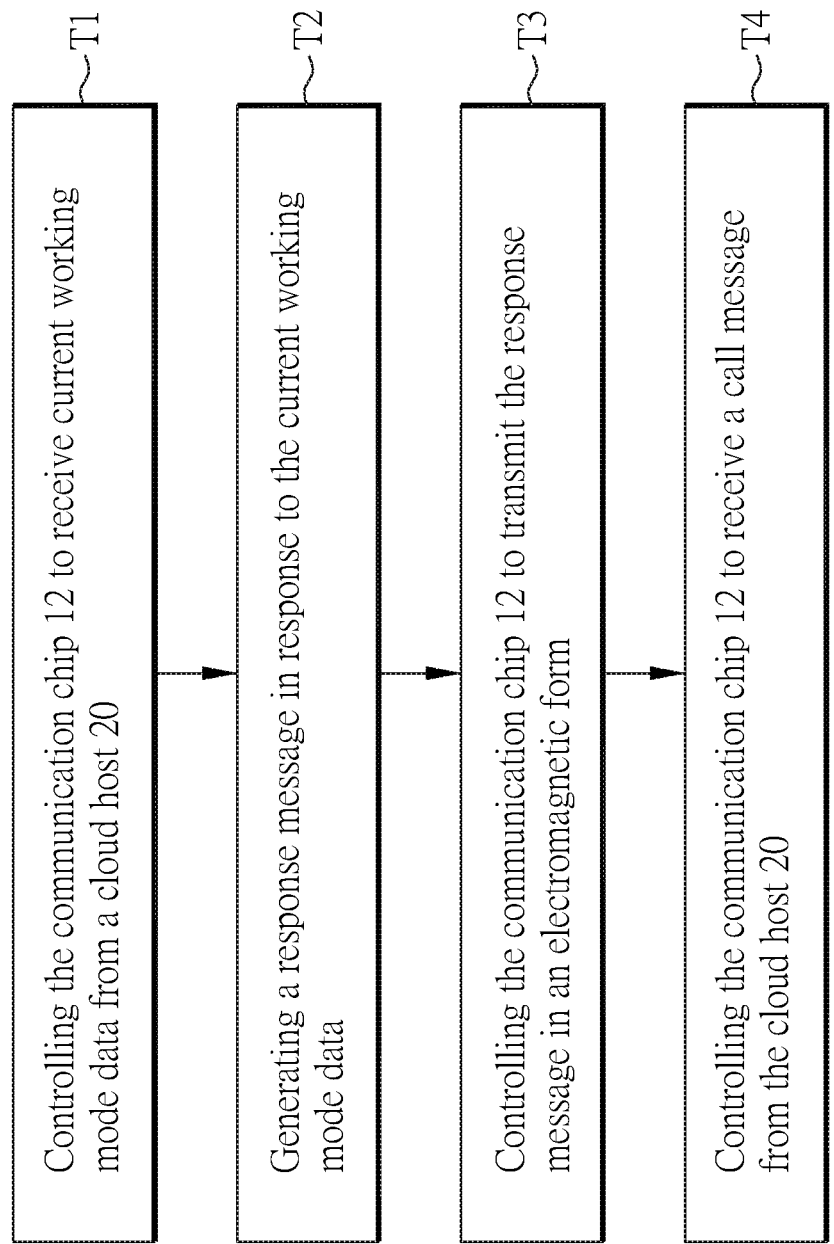
FIG. 10 shows the process of the processing chip according to the fourth embodiment of the present invention.

FIG. 10 shows the process of the processing chip 11 according to the fourth embodiment of the present invention. The processing chip 11 is configured to execute the following steps T1 to T4:

Step T1 is provided to control the communication chip 12 to receive current working mode data from a cloud host 20;

Step T2 is provided to generate a response message in response to the current working mode data;

Step T3 is provided to control the communication chip 12 to transmit the response message in an electromagnetic form; and Step T4 is provided to control the communication chip 12 to receive a call message from the cloud host 20.

In particular, in step T1, before staring the work, the user 3, such as the worker himself or his supervisor can move the wearable device 10 close to the cloud host 20, especially the transceiver module 22, so as to receive (or download) the current working mode data.

Then, in step T2, the processing chip 11 generates a response message, for example, to represent that the wearable device 10 has been registered on the cloud host 12, in response to the current working mode data. However, the response message may include more data.

Then, in step T3, the processing chip 11 controls the communication chip 12 to transmit the response message in an electromagnetic form.

After receiving the response message, the cloud host 20 determines the worker's attendance conditions, working conditions, body conditions or the local safety, and further determines whether to transmit the call message to contact with the worker or the ambulance staff. Accordingly, in step T4, the call message will be received by the communication chip 12 of the wearable device 10 and then sent to the processing chip 11 to activate some functions, for example an audio/video device 13, such as a lighting device, a virtual reality device, a pair of electronic glasses, a speaker or a siren, attached or connected to the wearable device 10.

The steps T1 to T4 in this embodiment can be executed in company with the steps S1 to S4 in the first embodiment, for example, in an order of step S1, step S2, step T1, step T2, step T3, step S3 and step S4. Other orders are also possible.

Figure 11:
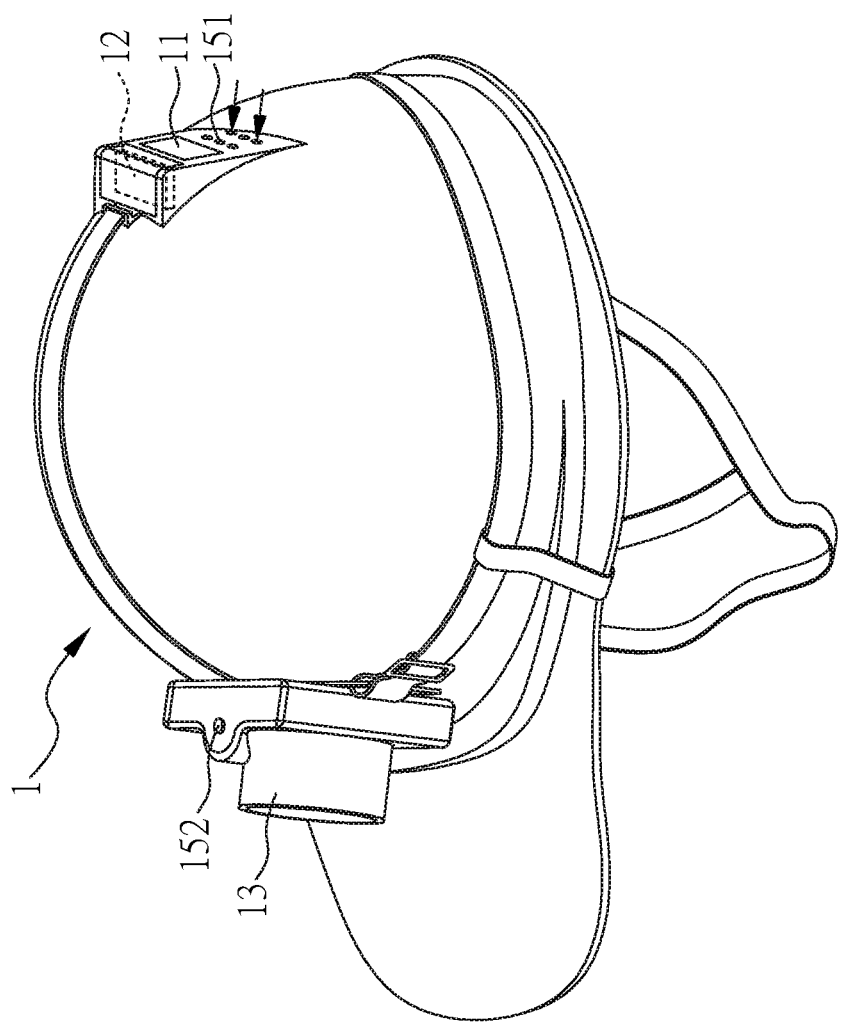
FIG. 11 shows the wearable device according to the fourth embodiment of the present invention being realized as a hard hat.

FIG. 11 shows the wearable device 10 according to the fourth embodiment of the present invention being realized as a hard hat. In other embodiments, it can be realized as a helmet, a headband, a pair of glasses, a watch, a wristband, a belt or the like.

FIG. 11 shows the wearable device 10 having a processing chip 11, a communication chip 12, an audio/video device 13, a gas detector 151 and a light detector 152. These components can be embedded in or attached to a body (such as a frame or a case) of the wearable device 10, depending on their respective purposes. In this case, the audio/video device 13 is a searchlight. The processing chip 11 sends the detected result from the light detector 152 back to the cloud host 20 through the communication chip 12, and then activates the searchlight according to a call message sent from the cloud host 20. Alternatively, the processing chip 11 may determine whether to activate the searchlight by comparing the detected result from the light detector 152 with the current working mode data stored in it.

Fifth Embodiment

Figure 12:
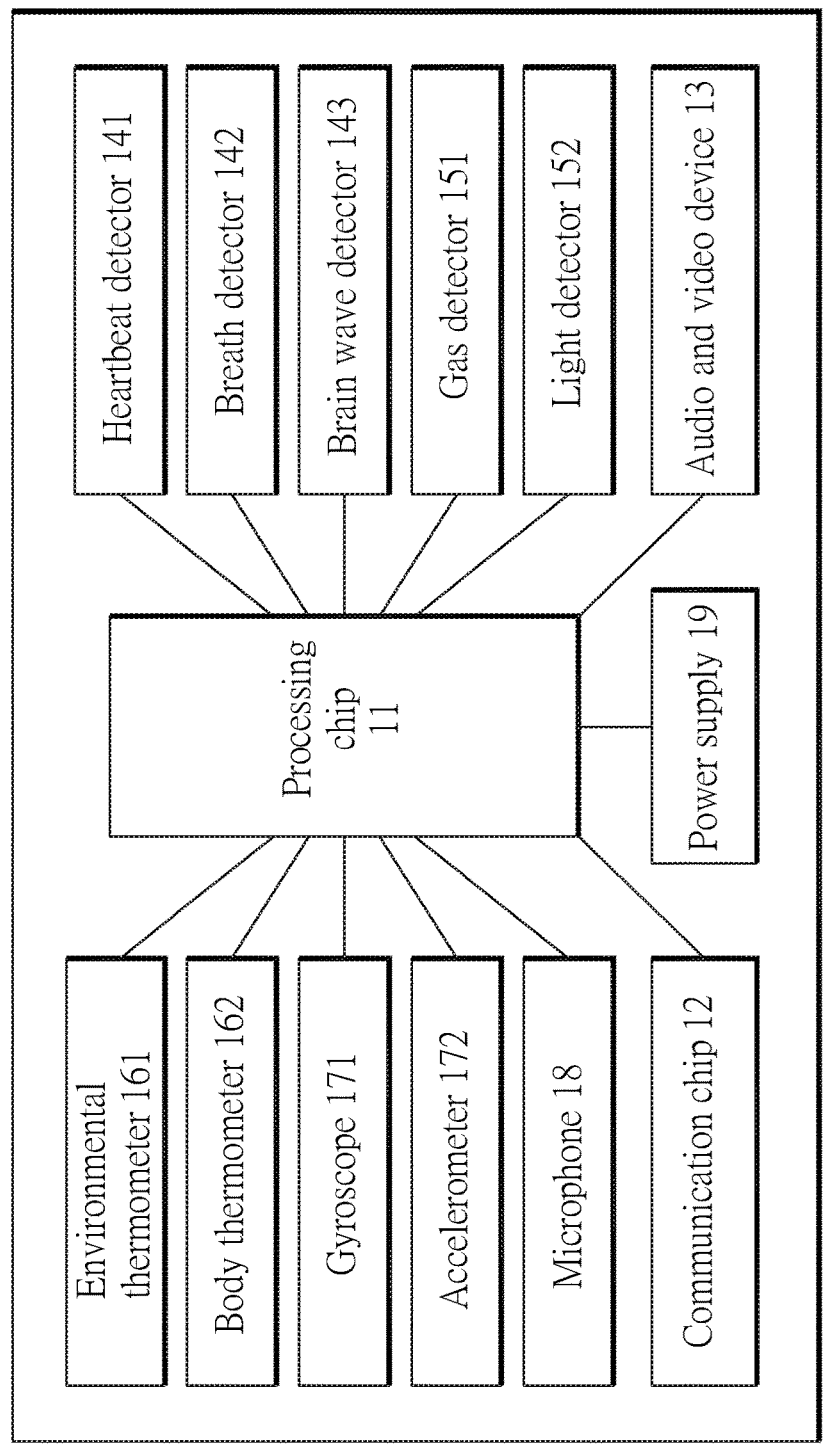
FIG. 12 shows a block diagram of the wearable device according to the fifth embodiment of the present invention.

FIG. 12 shows the wearable device 10 according to the fifth embodiment of the present invention.

In this case, the wearable device 10 further includes a heartbeat detector 141, a breath detector 142, a brain wave detector 143, a gas detector 151, a light detector 152, an environmental thermometer 161, a body thermometer 162, a gyroscope 171, an accelerometer 172, a microphone 18 and a power supply 19. Of course, the wearable device 10 may include one, some or all of these detection components. These detection components are connected to the processing chip 11, which controls the power supply 19 to provide power to these detection components. The processing chip 11 may activate one, some or all of these detection components according to the current working mode data, thereby saving power and memory.

The power supply 19 is typically a battery, which has limited power, and thus power saving becomes an important issue. In this embodiment, the processing chip 11 may turn on or off some of these detection components automatically according to the current working mode data to economize the power.

The heartbeat signal, the breath signal and the brain signal obtained by the heartbeat detector 141, the breath detector 142 and the brain wave detector 143, respectively, are send back to the cloud host 20 for allowing the processing module 24 to determine whether the wearable device 10 is attached to the worker's body, or whether the worker's body condition is normal. If the processing module 24 determines that the wearable device 10 is detached from the worker's body, or the worker's body condition is abnormal, it controls the transceiver module 22 to transmit the call message for calling other person to patrol around the location of the wearable device 10.

The gas detector 151 is used to detect oxygen, carbon dioxide, carbon monoxide, nitrogen dioxide, ethanol, hydrogen, ammonia, methane, propane, isobutane and other toxic gases, and then generate a gas signal. The gas detector 151 can be a metal oxide semiconductor chip.

The light detector 152 is used to detect intensity or wavelength of light, and then generate a light signal. The light detector 152 can be a photo-resistor, a charge-coupled device (CCD), or a complementary metal oxide semiconductor (CMOS) active pixel sensor.

The environmental thermometer 161 and the body thermometer 162 can be arranged on an inner surface and an outer surface of the wearable device 10, respectively, to measure environmental temperature and body temperature, so as to generate an environmental temperature signal and a body temperature signal.

The gas signal, the light signal, the environmental temperature signal and the body temperature signal are sent back to the cloud host 20 for the processing module 24 to determine whether the worker is in danger. If it determines that the worker is in danger, the control transceiver module 22 transmits a distress message. The distress message may be sent to the ambulance staff, or it may activate the video/audio device 13, such as a speaker or a siren, equipped by the wearable device 10.

The gyroscope 171 and the accelerometer 172 are used to detect the rotation (angular momentum or angular acceleration) and the movement (the momentum or the acceleration) of a body action, respectively, and combine them into the body action signal. The body action signal is sent back to the cloud host 20 for allowing the processing module 24 to determine whether the worker's body is in an idle state. If it determines that the worker's body is in an idle state, the control transceiver module 22 transmits a caution message to the wearable device 10 to remind the worker of returning to work. Besides, the gyroscope 171 and the accelerometer 172 can also be used to detect dangerous events, such as the worker's falling, slipping or hitting.

The microphone 18 is used for the user of the wearable device 10 (the worker) to communicate with the user of the cloud host (the supervisor).

In conclusion, the embodiments of the present invention aim to build a communication between the cloud host 20 and the wearable device 10 and, particularly, to activate the functions of the cloud host 20 and the wearable device 10 by typology for jointly arranging the working mode data, thereby precisely taking control of the workplace environment and the worker's conditions.

Although the present invention has been explained in relation to its preferred embodiments, it is to be understood that the embodiments, given above, are proposed for exemplification rather than for limitation, and that the present invention can be implemented, through many other possible modifications and variations in line with the features of the present invention. The scope of the present invention, as hereinafter claimed, covers the method and structure previously described, and the equivalents therewith.

What is claimed is:

1. A workplace management system, including:
   a wearable device including a processing chip and a communication chip connected to the processing chip;
   a cloud host in communication with the wearable device, the cloud host including an operation module, a transceiver module, a storage module storing a plurality of working mode data, and a processing module connected to the operation module, the transceiver module and the storage module, wherein each of the working mode data records a time reference value, a location reference value, an environmental reference value or a physiological reference value for each of different working modes;
   wherein the processing module is configured to:
   apply current working mode data from the working mode data stored in the storage module according to an instruction given by a user using the operation module;
   control the transceiver module to transmit the current working mode data in an electromagnetic form;
   control the transceiver module to receive a response message generated by the wearable device in response to the current working mode data; and
   control the transceiver module to transmit a call message according to the response message, wherein the response message includes a plurality of detected signals; the detected signals include a heartbeat signal, a breath signal, a brain wave signal, a gas signal, a light signal, an environmental temperature signal, a body temperature signal, a body action signal or an acoustic signal; and the processing module compares the detected signals with the time reference value, the location reference value, the environmental reference value or the physiological reference value to determine whether to control the transceiver module to transmit the call message.

2. The workplace management system as claimed in claim 1, wherein
   the transceiver module further includes a near-field module and a far-field module;
   the communication chip further includes a near-field chip and a far-field chip; and
   the processing module determines either to communicate with the near-field chip by the near-field module, or to communicate with the far-field chip by the far-field module, according to a location signal transmitted from the wearable device.

3. The workplace management system as claimed in claim 1, wherein the processing module compares a time signal and a location signal transmitted from the wearable device with the time reference value and the location reference value to determine an attendance record.

4. The workplace management system as claimed in claim 1, wherein the processing module determines whether the wearable device is attached to a body, or whether the body is normal, according to the detected signals.

5. The workplace management system as claimed in claim 1, wherein, if determining that the body is in an idle state according to the detected signals, the processing module controls the transceiver module to transmit a caution message to the wearable device; if determining that the body is in danger, the processing module controls the transceiver module to transmit a distress message.

6. The workplace management system as claimed in claim 1, wherein the processing module recalculates the current working mode data with the detected signals to update the time reference value, the location reference value, the environmental reference value or the physiological reference value of the working mode data, periodically or in real time.

7. The workplace management system as claimed in claim 1, wherein the processing module is configured to:
   recalculate the current working mode data with the response message and obtain a recalculated result; and store the recalculated result into the storage module to overwrite the working mode data originally existing therein.

8. A wearable device used for a workplace management system, including:
   a processing chip and a communication chip connected to the processing chip;
   wherein the processing chip is configured to:
   control the communication chip to receive current working mode data from a cloud host, wherein the cloud host including a storage module storing a plurality of working mode data and a processing module connected to the storage module, and each of the working mode data records a time reference value, a location reference value, an environmental reference value or a physiological reference value for each of different working modes;
   generate a response message in response to the current working mode data wherein the response message includes a plurality of detected signals; and the detected signals include a heartbeat signal, a breath signal, a brain wave signal, a gas signal, a light signal, an environmental temperature signal, a body temperature signal, a body action signal or an acoustic signal;
   control the communication chip to transmit the response message in an electromagnetic form; and
   control the communication chip to receive a call message from the cloud host wherein the call message is transmitted from the processing module of the cloud host, which compares the detected signals with the time reference value, the location reference value, the environmental reference value or the physiological reference value to determine whether to transmit the call message.

9. The wearable device as claimed in claim 8, wherein the processing chip activates a heartbeat detector, a breath detector, a brain wave detector, a gas detector, a light detector, an environmental thermometer, a body thermometer, a gyroscope, an accelerometer or a microphone connected to the processing chip according to the current working mode data.

* * * * *